US012688567B2

(12) United States Patent
Arlazarov et al.

(10) Patent No.: US 12,688,567 B2
(45) Date of Patent: Jul. 21, 2026

(54) METHOD FOR DETECTING AND LOCALIZING A FALSIFIED AREA IN JPEG IMAGES

(71) Applicant: Smart Engines Service, LLC, Moscow (RU)

(72) Inventors: Nikita Viktorovich Arlazarov, Moscow (RU); Irina Andreevna Kunina, Aleksandrovsky district (RU); Dmitrij Valerevich Polevoj, Moscow (RU); Aleksandr Vasilevich Chujko, Izhevsk (RU)

(73) Assignee: SMART ENGINES SERVICE, LLC, Moscow (RU)

( * ) Notice: Subject to any disclaimer, the term of this patent is extended or adjusted under 35 U.S.C. 154(b) by 569 days.

(21) Appl. No.: 18/137,237

(22) Filed: Apr. 20, 2023

(65) Prior Publication Data

US 2023/0386003 A1 Nov. 30, 2023

(30) Foreign Application Priority Data

May 25, 2022 (RU) ............................ RU2022114078

(51) Int. Cl.
*G06T 7/00* (2017.01)
*G06T 7/73* (2017.01)

(52) U.S. Cl.
CPC .............. *G06T 7/0002* (2013.01); *G06T 7/73* (2017.01); *G06T 2207/10024* (2013.01);
(Continued)

(58) Field of Classification Search
CPC .................. G06V 10/431; G06V 20/95; G06T 2207/20021; G06T 2207/20036;
(Continued)

(56) References Cited

U.S. PATENT DOCUMENTS

2007/0195106 A1* 8/2007 Lin ........................ H04N 19/60
345/589
2021/0065355 A1* 3/2021 Atzmon ................ G06T 7/0002

OTHER PUBLICATIONS

Nguyen, Hoai Phuong, et al. "An Image Forgery Detection Solution based on DCT Coefficient Analysis." ICISSP. 2019. (Year: 2019).*

(Continued)

*Primary Examiner* — Gregory A Morse
*Assistant Examiner* — Stefano Anthony Dardano
(74) *Attorney, Agent, or Firm* — Millen, White, Zelano & Branigan, P.C.; Miki Motohashi Iino

(57) ABSTRACT

This disclosure relates to verifying the authenticity of images of documents. Embodiments increase the accuracy of determining the falsified area in the image. The method for detecting and localizing a falsified area in JPEG images is to consider, in the RGB color space, an image that was subjected to JPEG compression. The detection of a falsified area is based on a search for inconsistencies in the structure of the DCT coefficients. The DCT coefficients of the image are calculated with the preservation of information about the position of the corresponding 8×8 pixel blocks, and the quantization matrix is estimated by the calculated DCT coefficients, while the image is split into several blocks. The quantization step is estimated for each of the frequencies in each block, the position of the JPEG compression grid is searched, discrepancies between DCT coefficients and the quantization matrix are searched, and falsified areas are localized.

9 Claims, 9 Drawing Sheets

(52) U.S. Cl.
CPC ............... *G06T 2207/20021* (2013.01); *G06T 2207/20036* (2013.01); *G06T 2207/20056* (2013.01); *G06T 2207/20076* (2013.01); *G06T 2207/30176* (2013.01)

(58) Field of Classification Search
CPC .. G06T 9/005; G06T 5/40; G06T 9/00; G06T 2207/20052; G06T 2207/30176; G06T 7/0002; H04N 19/60; H04N 19/126; H04N 19/124; H04N 19/12
See application file for complete search history.

(56) References Cited

OTHER PUBLICATIONS

Thai, Thanh Hai, et al. "JPEG quantization step estimation and its applications to digital image forensics." IEEE Transactions on Information Forensics and Security 12.1 (2016): 123-133. (Year: 2016).*

Lin, Zhouchen, et al. "Fast, automatic and fine-grained tampered JPEG image detection via DCT coefficient analysis." Pattern Recognition 42.11 (2009): 2492-2501. (Year: 2009).*

Hussain, Israr, et al. "A novel deep learning framework for double JPEG compression detection of small size blocks." Journal of Visual Communication and Image Representation 80 (2021): 103269. (Year: 2021).*

Dalmia, Nandita, and Manish Okade. "First quantization matrix estimation for double compressed JPEG images utilizing novel DCT histogram selection strategy." Proceedings of the Tenth Indian Conference on Computer Vision, Graphics and Image Processing. 2016. (Year: 2016).*

Ye, S., et al., Detecting Digital Image Forgeries by Measuring Inconsistencies of Blocking Artifact, 2007 IEEE International Conference on Multimedia and Expro, Beijing, China, 2007, pp. 12-15.

Bianchi, T., et al., Improved DCT coefficient analysis for forgery localization in JPEG images, 2011 IEEE International Conference on Acoustics, Speech and Signal Processing (ICASSP), Prague, Czech Republic, 2011, pp. 2444-2447.

Li, W., et al., Passive Detection of Doctored jpeg image via Block Artifact Grid Extraction, Signal Processing, 2009, 89, pp. 1821-1829.

* cited by examiner

800

METHOD FOR DETECTING AND LOCALIZING A FALSIFIED AREA IN JPEG IMAGES

CROSS-REFERENCE TO RELATED APPLICATIONS

This application claims priority to Russian Application No. 2022114078, filed on May 25, 2022, which is hereby incorporated herein by reference as if set forth in full.

BACKGROUND

Field of the Invention

The embodiments described herein relate to the field of checking the authenticity of document images of various types.

Description of the Related Art

Various methods for detecting and localizing falsified areas in Joint Photographic Experts Group (JPEG) images are known from the prior art. See, e.g., p, 1. S. Ye, Q. Sun and E. Chang, "Detecting Digital Image Forgeries by Measuring Inconsistencies of Blocking Artifact,"2007 IEEE International Conference on Multimedia and Expo, 2007, pp. 12-15, doi: 10.1109/ICME.2007.4284574 ("Ref1"); T. Bianchi, A. De Rosa and A. Piva, "Improved DCT coefficient analysis for forgery localization in JPEG images,"2011 IEEE International Conference on Acoustics, Speech and Signal Processing (ICASSP), 2011, pp. 2444-244'7, doi: ("Ref2"); and Weihai Li, Yuan, Nenghai Yu, Passive detection of doctored JPEG image via block artifact grid extraction, Signal Processing, Volume 89, Issue 9, 2009, Pages 1821-1829, ISSN 0165-1684, https://doi.org/10.1016/j.sigpro.2009.03.025 ("Ref3").

SUMMARY

Accordingly, systems, methods, and non-transitory computer-readable media are disclosed for detecting and localizing a falsified area in a JPEG image.

In an embodiment, a method comprises using at least one hardware processor to: receive a Joint Photographic Experts Group (JPEG) image; compute discrete cosine transform (DCT) coefficients of the JPEG image; estimate a quantization matrix of the JPEG image based on the computed DCT coefficients; search for discrepancies between the computed DCT coefficients and the estimated quantization matrix; and determine whether the JPEG image contains any falsified areas based on a result of the search. The method may further comprise using the at least one hardware processor to, when determining that the JPEG image contains one or more falsified areas, identify a location of each of the one or more falsified areas.

Computing DCT coefficients of the JPEG image may comprise: complementing sides of the JPEG image up to a multiplicity with eight black pixels; transforming the JPEG image from a red-green-blue (RGB) color space to a luma-blue-difference-chroma-red-difference-chroma (YCbCr) color space; splitting a brightness channel in the YCbCr color space into a plurality of blocks of 8×8 pixels; applying a discrete cosine transform to each of the plurality of blocks; and discarding any of the plurality of blocks that contains pixels with saturated values.

Estimating the quantization matrix of the JPEG image based on the computed DCT coefficients may comprise, for each of 64 frequencies in each of the plurality of blocks: calculating a factorial histogram h, wherein h(x) is a number of DCT coefficients that do not have a remainder when divided by x; normalizing the factorial histogram h by a total number of DCT coefficients; and estimating a quantization step of the quantization matrix for the frequency using the normalized factorial histogram h.

Estimating the quantization step of the quantization matrix using the normalized factorial histogram h may comprise: calculating $\widehat{q_1} = \max\{x|h(x) \geq T_1\}$, wherein $T_1$ is a predefined threshold; when $\widehat{q_1} > 2$, estimating the quantization step for the frequency as $\widehat{q_1}$; and when $\widehat{q_1} \leq 2$, calculating $y = \max\{x|h(x) \geq T_2\}$, wherein $T_2$ is a predefined threshold, when $y < 4$, estimating the quantization step for the frequency as $\widehat{q_1}$, and when $y \geq 4$, constructing a modified factorial histogram $\underline{h}$, wherein $\underline{h}(x)$ is the number of DCT coefficients that do not have a remainder when divided by x and do not belong to a set $M=\{ky\pm 1, k \in Z\}$, wherein k is an integer value within a range Z, normalizing the modified factorial histogram $\underline{h}$ by the total number of DCT coefficients that do not belong to the set M, calculating $\widehat{q_2} = \max\{x|\underline{h}(x) \geq T_3\}$, wherein $T_3$ is a predefined threshold, when $\widehat{q_2} > 3$, estimating the quantization step for the frequency as $\widehat{q_2}$, and when $\widehat{q_2} \leq 3$, estimating the quantization step for the frequency as $\widehat{q_1}$. Estimating the quantization step of the quantization matrix may further comprise estimating a quantization step over an entirety of the JPEG image based on the quantization step estimated for each of the 64 frequencies of each of the plurality of blocks.

Searching for discrepancies between the computed DCT coefficients and the estimated quantization matrix may comprise: generating a first image $I_1$ in which each of the plurality of blocks is assigned a pixel, wherein each pixel for each of the plurality of blocks has a value representing a number of frequencies at which a DCT coefficient corresponding to the block does belong to a range $\{[k\hat{q}-1], k\hat{q}+\in Z\}$, wherein k is an integer value within a range Z, and $\hat{q}$ is the estimated quantization step for a respective frequency; determining a set $M_2$ of frequencies, for which at least one of the plurality of blocks at one of the frequencies in set $M_2$ has a computed DCT coefficient not belonging to the range $\{[k\hat{q}-1], k\hat{q}+\in Z\}$; generating a second image $I_2$ in which each of the plurality of blocks is assigned a pixel, wherein a size of the second image $I_2$ is a same size as the first image $I_1$, and wherein each pixel for each of the plurality of blocks in the second image $I_2$ has a value representing a number of frequencies at which the DCT coefficient corresponding to the block has an absolute value greater than one; and generating a third image $I_3$, with a same size as the first image $I_1$ and the second image $I_2$, according to:

$$I_3(u) = \max\left\{\frac{I_1(u)-t}{I_2(u)+1}, 0\right\}$$

wherein u is a pixel position, and t is a predefined value.

The method may further comprise using the at least one hardware processor to, when determining that the JPEG image contains one or more falsified areas, identify a location of each of the one or more falsified areas by: generating a fourth image $I_4$ by applying a morphological operation to the third image $I_3$; and generating a fifth image $I_5$ with a same size as the JPEG image, wherein each pixel within each of the plurality of blocks in the fifth image $I_5$ has a value equal to a value of a pixel in the fourth image $I_4$ that corresponds to that block. The method may further comprise using the at least one hardware processor to calculate a probability of manipulation based on the fourth image $I_4$.

The method may further comprise using the at least one hardware processor to search for a position of a JPEG compression grid for the JPEG image.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
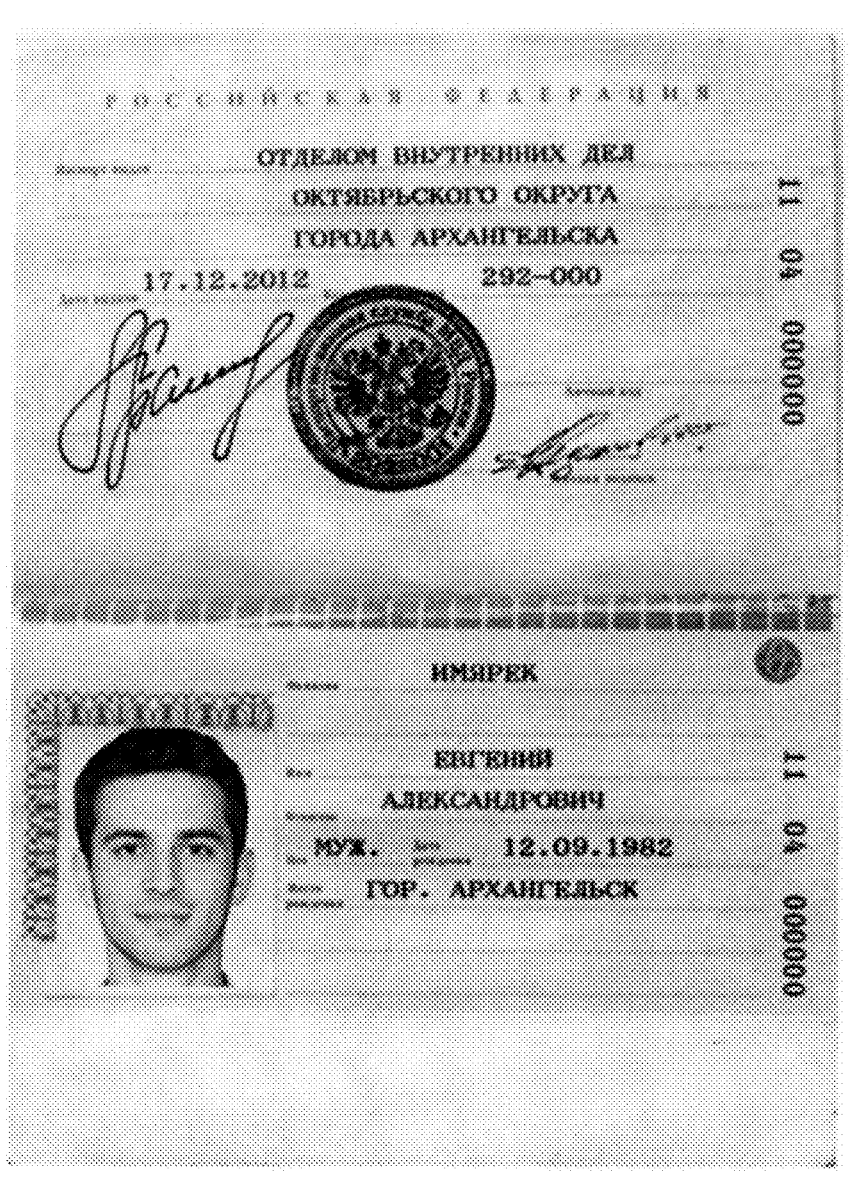
FIG. 1 illustrates a source JPEG image, according to an example.

In an embodiment, systems, methods, and non-transitory computer-readable media are disclosed for detecting and localizing a falsified area in a JPEG image. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In Ref1, the blocking artifact measure (BAM) is calculated from the image. In an embodiment, for each 8×8 block, the proportion of mismatched frequencies is calculated. This approach makes it possible to register inconsistent blocks even at high quality JPEG compression of the source image. In addition, in Ref1, another method for estimating the quantization matrix was used. An embodiment of the method disclosed in the present disclosure makes it possible to estimate reliably the quantization matrix without the influence of falsified regions.

In Ref2, it is assumed that the source areas will be subjected to double compression, while the falsified areas will have only one compression. To search for falsified areas, a statistical model is built to estimate the probability that the area was subjected to double compression. The present disclosure assumes that the falsified image was saved in a format without loss. However, disclosed embodiments also work if the falsified image is saved in high quality JPEG format. In contrast to Ref3, in a disclosed embodiment, each 8×8 block is independently detected as falsified, which makes it possible to detect even small areas of falsification, which statistical methods are usually not capable of.

In Ref3, artifacts of JPEG compression blocks are studied. Since the discrete cosine transform (DCT) is made separately in each 8×8 block, the boundaries between such blocks are noticeable. The pasted area will be assumed to have an inconsistent mesh. Embodiments of the disclosed method use a mathematical model of DCT coefficients, which makes it possible to detect falsified areas with a high probability, regardless of what is depicted on them, and is applicable at high compression quality of the source image, when block artifacts are hardly noticeable.

An objective of disclosed embodiments is to eliminate the shortcomings of the prior art. The technical result is to provide a method for detecting and localizing a falsified area in JPEG images, which makes it possible to detect with high probability, accuracy, and reliability even small areas of falsification, regardless of what is depicted on them. This method is applicable at a high compression quality of the source image, when block artifacts are weakly noticeable, and also provides the ability to reliably evaluate the quantization matrix without the influence of falsified areas. The objective is solved, and the claimed technical result is achieved through the disclosed method of detecting and localizing falsified areas in JPEG images.

The disclosed method is applicable in the case when it is necessary to determine whether manipulations were performed to change the content of a specific image (e.g., by copy-paste or splicing operations) and to localize falsified areas, for example, to detect falsifications in the image of a document and, thereby, refute the authenticity of the document data.

In an embodiment, the method for detecting and localizing a falsified area in JPEG images is as follows.

An image in the red-green-blue (RGB) color space is considered. It is assumed that the source image was subjected to JPEG compression, after which, using software, any falsifications were introduced, and the modified image was saved in a format without losses.

The detection of falsified areas is based on the search for inconsistencies in the structure of the DCT coefficients of a JPEG image. If the image was subjected to JPEG compression, then its DCT coefficients at a fixed frequency (calculated at the same grid position of 8×8 pixels at which JPEG compression was performed) will be distributed around values being multiples of the quantization step q, (the number in the corresponding frequency of the quantization matrix at which JPEG compression was performed):

$$d \in [kq-1, kq+1], k \in Z$$

Figure 2:
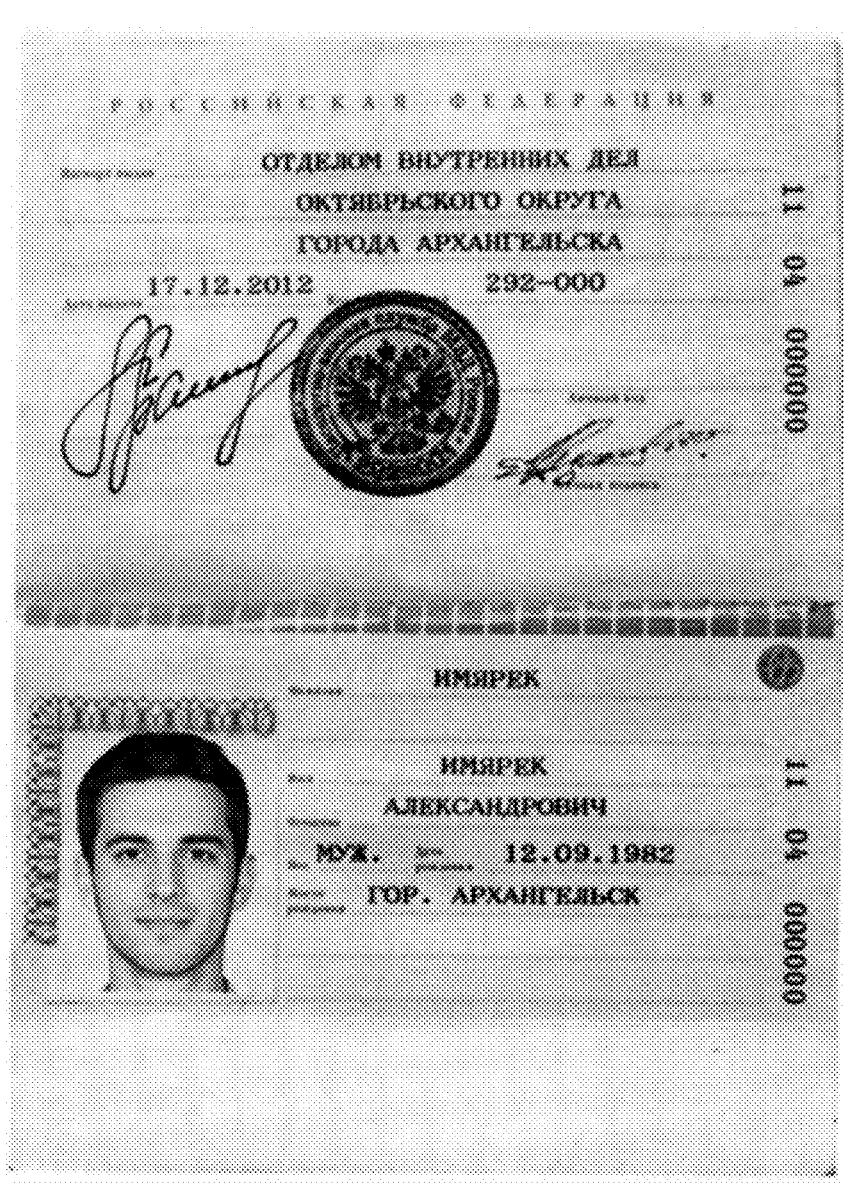
FIG. 2 illustrates the source JPEG image with a falsified area, according to an example.

With a high probability, the DCT coefficients in the falsified area will not satisfy this property. Thus, for example, when copy-pasting, if the internal grid of the JPEG compression of the pasted area does not match the external grid, the DCT coefficients of the pasted area will not have non-trivial periods, despite the fact that this area was compressed with the same quality as the source image. The probability of mismatch between the outer grid and the inner grid is 63/64. An illustration of a source JPEG-compressed image with a quality index of 90 is shown in FIG. 1. FIG. 2 presents an illustration of this image with a falsified copy-paste made in paint.net software and then saved as PNG (without losses).

Computing the DCT Coefficients of an Image

For the subsequent steps of the algorithm, it is necessary to calculate the DCT coefficients of the image with the preservation of information about the position of the blocks of 8×8 pixels corresponding to the coefficients. This is achieved by the following steps.

1. Complementing the image sides up to the multiplicity with 8 black pixels.

2. Color space transformation from RGB to YCbCr.

3. Breaking the brightness channel in the YCbCr (Y) color space into blocks of 8×8 pixels.

4. Application of discrete cosine transform for each block of 8×8 pixels.

5. Rejecting from consideration blocks in which there are pixels with saturated values (0 or 255) in any RGB channel and blocks in which the brightness (Y) in YCbCr at the moment of transition from RBG to YCbCr went beyond the range [0, 1]. Such pixels will be called saturated. Step 5 is necessary, since the DCT coefficients in such blocks can behave unpredictably and do not fall into the range $[kq-1, kq+1]$, where $k \in Z$, and $q$ is the quantization step.

Estimation of the Quantization Matrix

Based on the calculated DCT coefficients, the quantization matrix is estimated. To avoid the influence of the falsified area on the matrix estimation, the image is divided into several blocks. Next, for each of the 64 frequencies in each block, the quantization step is estimated. It comprises the following steps.

1. Calculation of the factorial histogram h, wherein h(x) is the number of DCT coefficients that are divided by x without remainder.

2. Normalization of h by the total number of DCT coefficients.

3. Estimation of the quantization step, as $\hat{q}=\max\{x|h(x) \geq T_1\}$, for some threshold $T_1$.

4. If $\hat{q}>2$, the evaluation ends.

5. If $\hat{q} \leq 2$, find $y=\max\{x|h(x) \geq T_2\}$, for some threshold $T_2$.

6. If $y<4$, the evaluation ends.

7. Construction of a modified factorial histogram $\underline{h}$, wherein $\underline{h}(x)$ is the number of DCT coefficients divisible by x without a remainder and not belonging to the set $M=\{ky\pm1, k \in Z\}$.

8. Normalization of $\underline{h}$ by the total number of DCT coefficients not belonging to the set M.

9. Calculation of $\widehat{q_2}=\max\{x|\underline{h}(x) \geq T_3\}$, for some threshold $T_3$. If $\widehat{q_2}>3$ the quantization step is evaluated as $\widehat{q_2}$, otherwise as $\hat{q}$. In steps 5-9, an attempt is made to eliminate excessive noise in the histogram of DCT coefficients and make reestimation. If a sufficiently large period (>3) is found, it is accepted as true.

For each frequency, the quantization step mode is taken over all blocks, where the step estimate is not equal to 1:

$$\hat{q}_i = M_0(\widehat{q_{i1}}, \widehat{q_{i2}}, ..., \widehat{q_{ik}})$$

where $\hat{q}_i$ is the estimate of the quantization step over the entire image for the i-th frequency, $\widehat{q_{ij}}$ is the estimate of the quantization step for the $\hat{i}$-th frequency of the $\hat{j}$ block, which is not equal to 1, and $M_0$ is the mode capture operator.

If $\hat{q}_i<5$, then the quantization step for the i-th frequency is assumed to be equal to 1 and is not involved in the search for inconsistencies, since the set of ranges $\{k\hat{q}_i \pm, k \in Z\}$ in this case fills almost the entire numerical axis. In the case when the true quantization step is equal to 1, despite the fact that the mode is taken by nonidentity values, the resulting estimate will be less than five due to the fundamental distribution of DCT coefficients and will not be involved further.

This makes it possible to evaluate the quantization matrix stably against falsified areas, even if they occupy more than half of the image.

Finding the Position of the JPEG Compression Grid

If the estimated quantization matrix consists of a large number of units (a small number of frequencies with detected non-trivial periods in the histogram of DCT coefficients), it can be assumed that either the source image was compressed with a high quality index, or that the split of the image into blocks of 8×8 pixels (compression mesh) is not the same as the splitting that was applied in the JPEG compression.

To exclude the second option, an algorithm of searching the JPEG compression grid position is applied. An area of some size is selected in the image. It is chosen so that the histograms of DCT coefficients from these areas would be sufficiently informative. To do this, weakly textured areas and areas with a lot of saturated pixels are excluded. There are 64 options for the position of the JPEG compression grid. For each of the possible positions, the quantization matrix is estimated as described earlier, but only for the selected area, not for the entire image.

The first position in the estimated matrix of which there is a sufficient number of non-trivial values is accepted.

It is worth noting that it is unreasonable from the point of view of computational costs to search for the position of the JPEG compression grid with such an algorithm initially (before the completion of the above steps). With a high probability, the position of the grid coincides with the naive splitting indicated earlier.

Search for Discrepancies Between DCT Coefficients and Quantization Matrix

Two auxiliary images $I_1$ and $I_2$ are built from the values as follows.

Each 8×8 block from the splitting at the selected position of the JPEG compression grid is assigned a pixel with the same coordinates in image $I_1$ and in image $I_2$. The sizes of $I_1$ and $I_2$ will match. For each pixel in $I_1$, the number of frequencies is recorded at which the DCT coefficient corresponding to this pixel block does not fall into any range from the set $\{[k\hat{q}-1, k\hat{q}+1], k \in Z\}$, wherein $\hat{q}$ is the quantization step from the estimated quantization matrix corresponding to the frequency.

A set $M_2$ of frequencies is introduced so that at least one block at this frequency would have a DCT coefficient not belonging to any range from the set $\{[k\hat{q}-1, k\hat{q}+1], k \in Z\}$, wherein $k\hat{q}$ is the quantization step from the estimated quantization matrix corresponding to the frequency. In other words, each frequency from $M_2$ contributed at least one pixel of $I_1$. For each pixel in $I_2$, the number of frequencies, from the set $M_2$ at which the DCT coefficient corresponding to this pixel block has an absolute value greater than one, is recorded. An auxiliary image of $I_3$ values is formed with the same sizes as $I_1$ and $I_2$, according to the following formula:

$$I_3(u) = \max\left\{\frac{I_1(u)-t}{I_2(u)+1}, 0\right\}$$

where t is matched experimentally.

Thus, an image is obtained from values in the range [0, 1]. The value in each pixel may be interpreted as the proportion of frequencies at which the corresponding block is inconsistent, in the sense of the DCT coefficients, among those frequencies at which there are inconsistencies ($M_2$ set).

Figure 3:
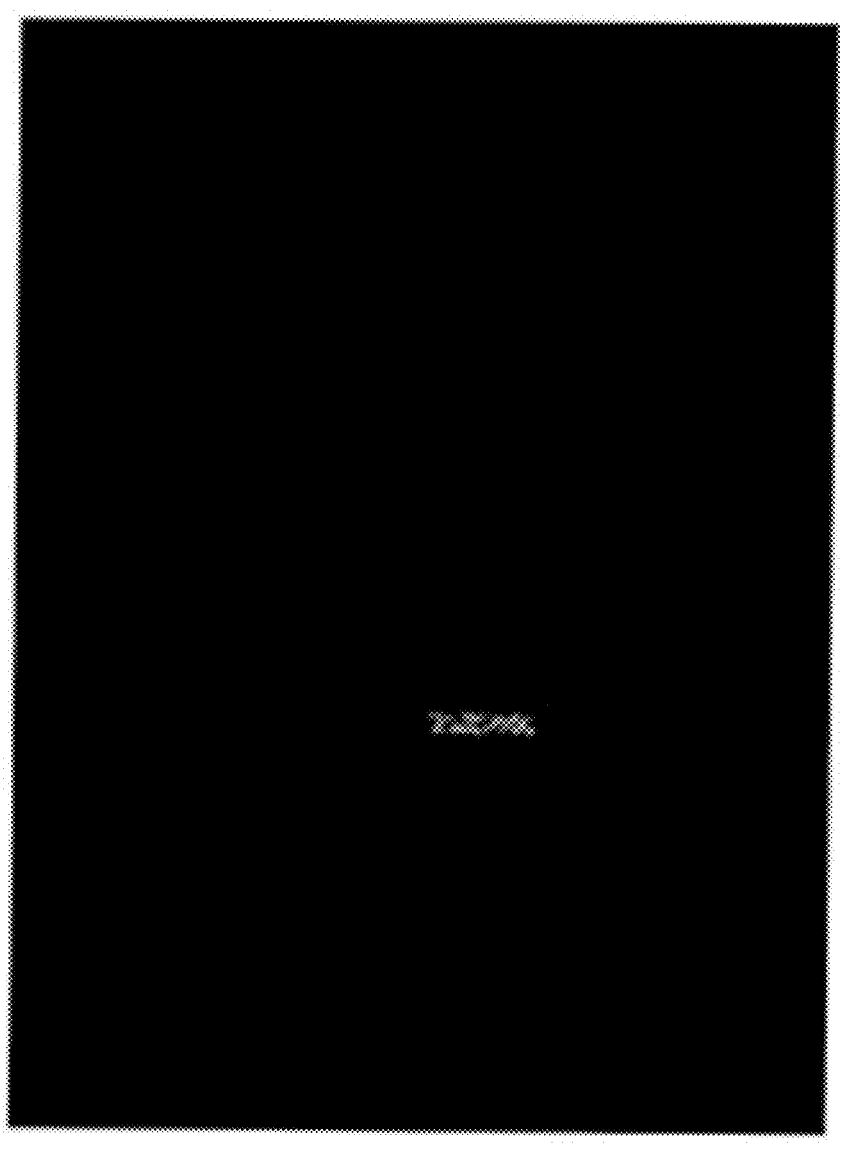
FIGS. 3-5 illustrate intermediate images used to search for discrepancies between DCT coefficients and a quantization matrix, according to an example.
Figure 4:
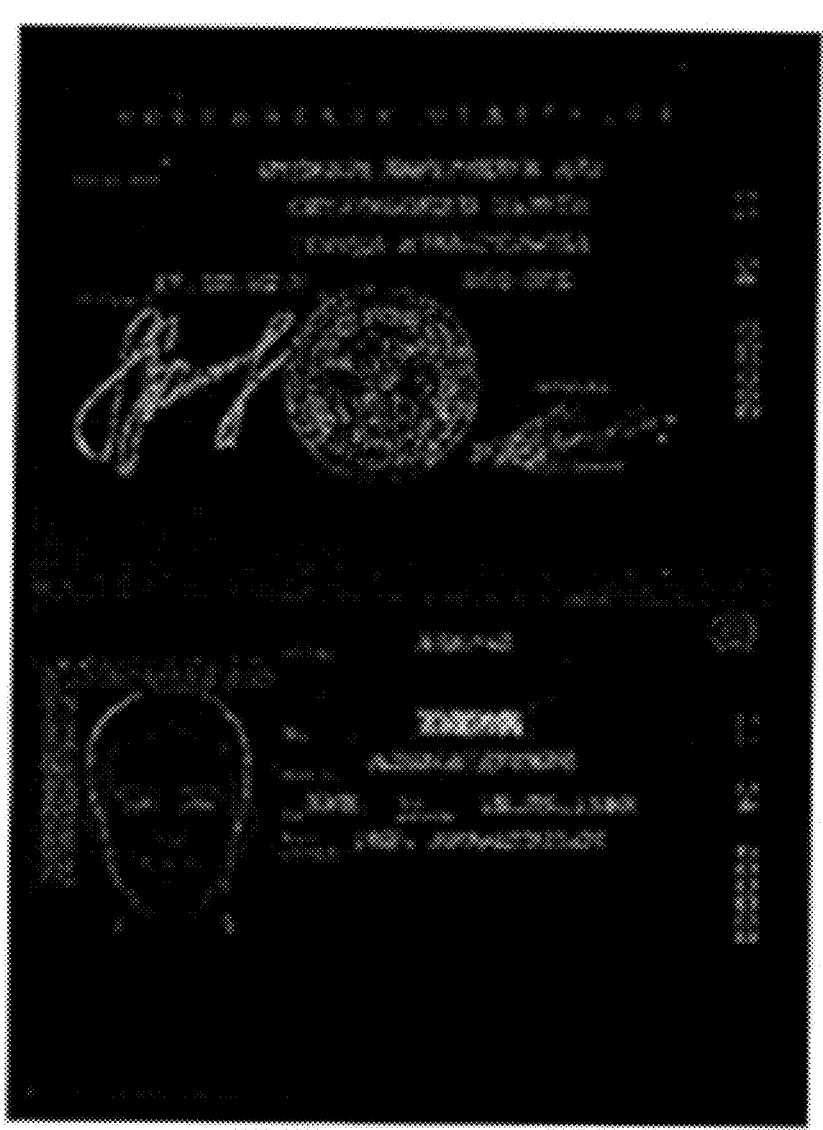
Figure 5:
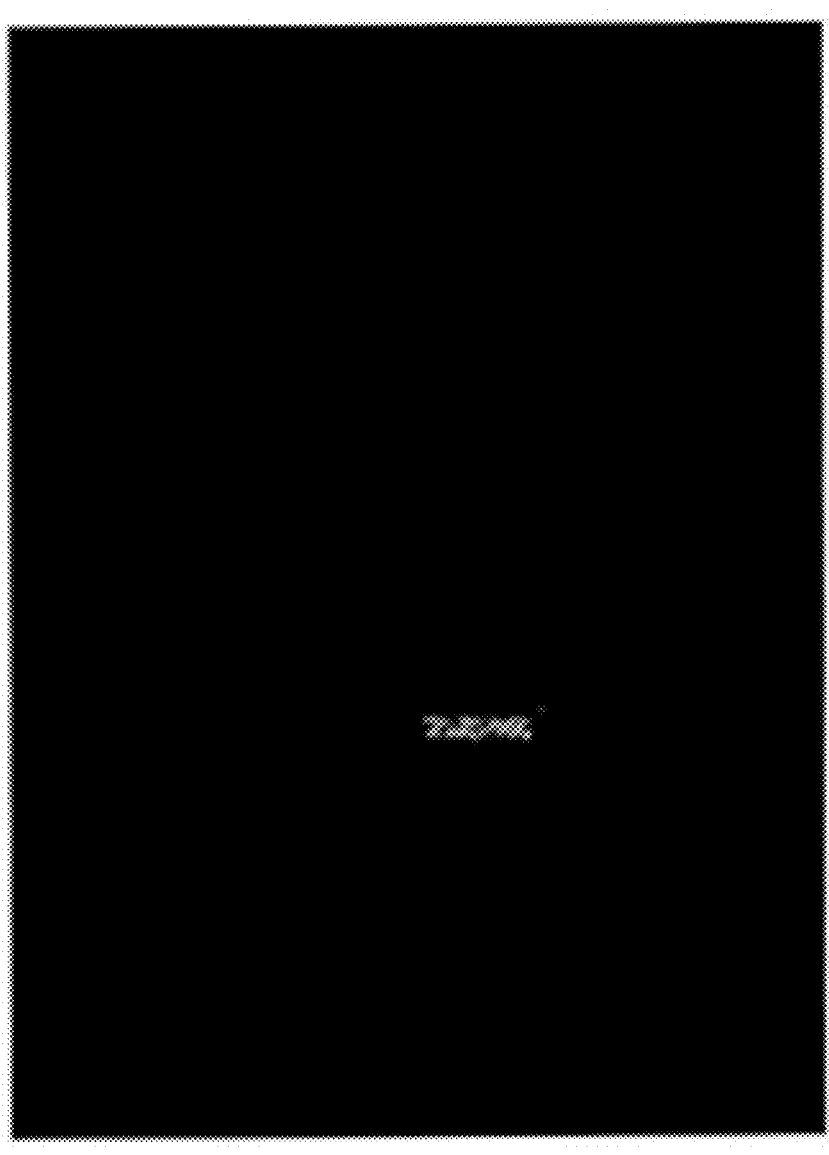

Contrasted images $I_1$, $I_2$, $I_3$ are shown in FIGS. 3, 4, and 5, respectively.

Localization of Falsified Areas

An auxiliary image $I_4$ is formed from the image $I_3$, on which morphological disconnection and blurring are additionally applied to eliminate parasitic elements resulting from random deviations of the DCT coefficients. Based on image $I_4$, the maximum is calculated—an estimate of manipulations probability. Image $I_4$ is used to construct image $I_5$ with the sizes of the original image. The pixel value within each 8×8 block of image $I_5$ is equal to the pixel value of image $I_4$ corresponding to this block.

Figure 6:
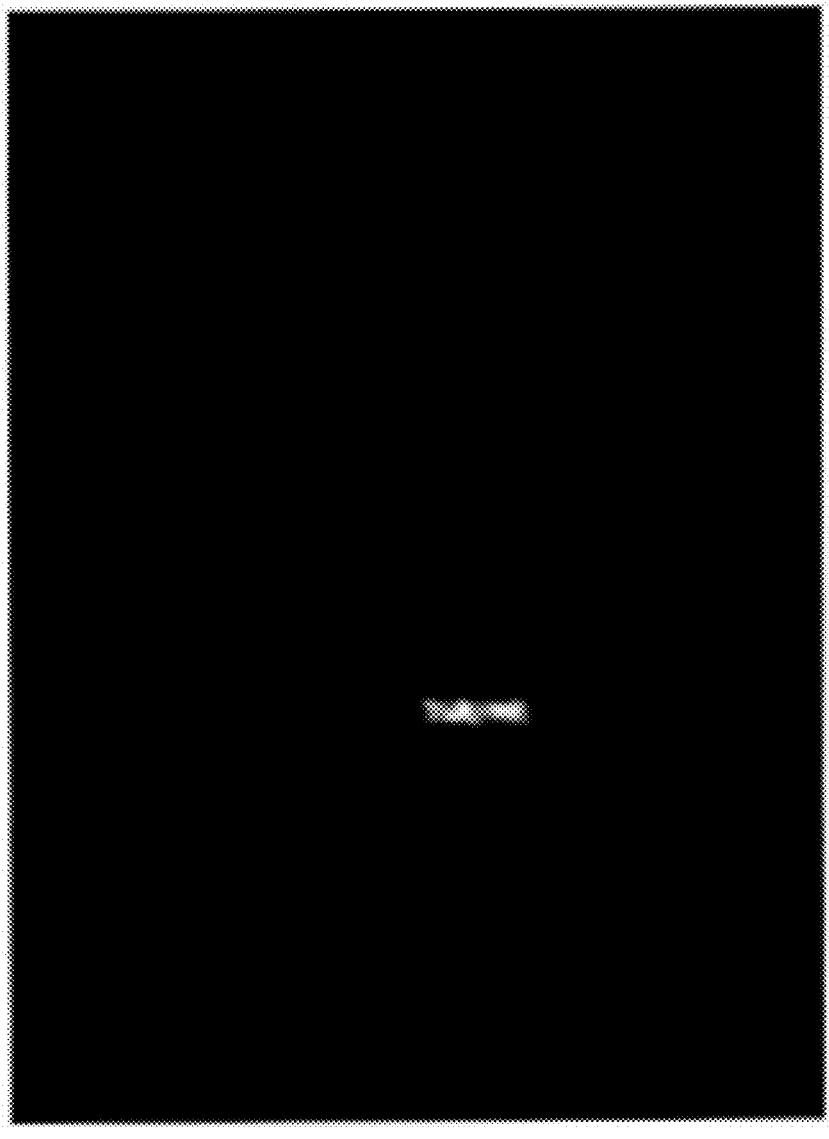
FIGS. 6 and 7 illustrate intermediate images used to localize a falsified area, according to an example.
Figure 7:
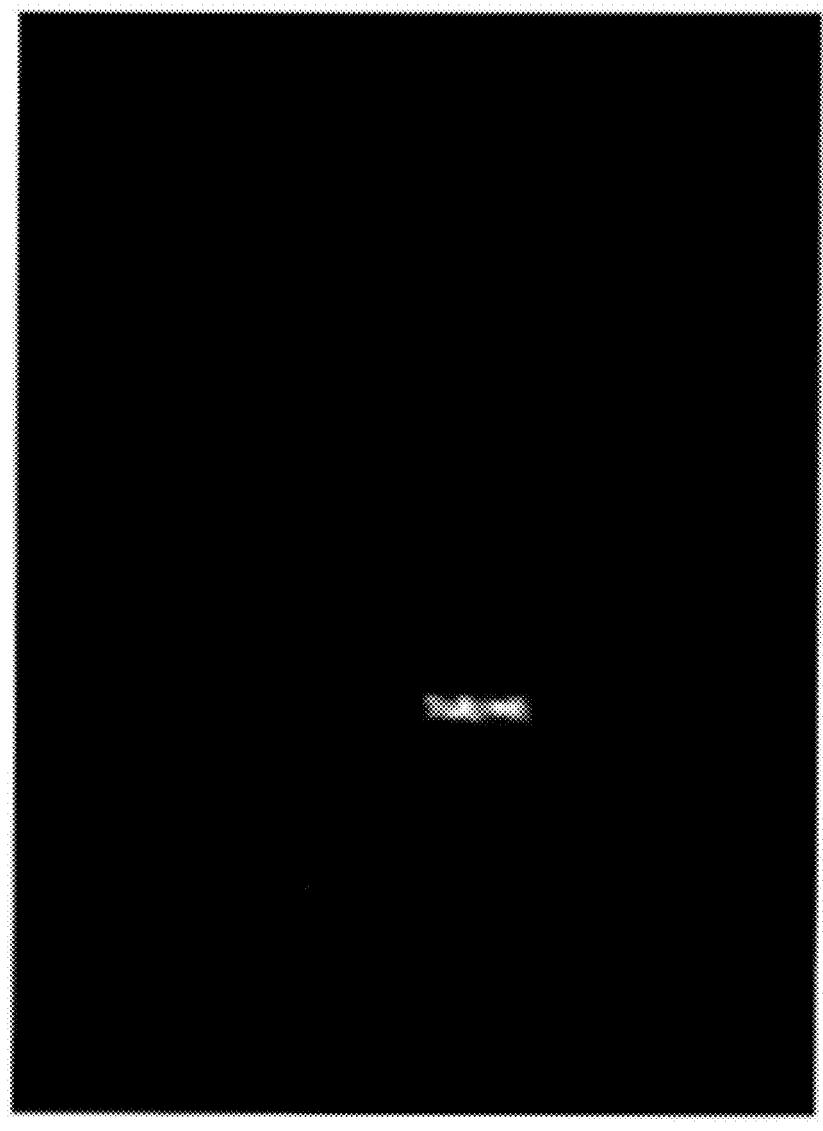

Estimation of manipulations probability and image $I_5$ are the result of the algorithm operation. For this example (FIG. 2), the estimate of manipulations probability is 0.68302. Contrasted images $I_4$ and $I_5$ are shown in FIGS. 6 and 7, respectively.

Thus, the above method for detecting and localizing a falsified area in JPEG images makes it possible to detect some cases of falsification of data in an image without reference to its content and has the potential to be used to verify the authenticity of images of documents of various types.

Example Process

Figure 8:
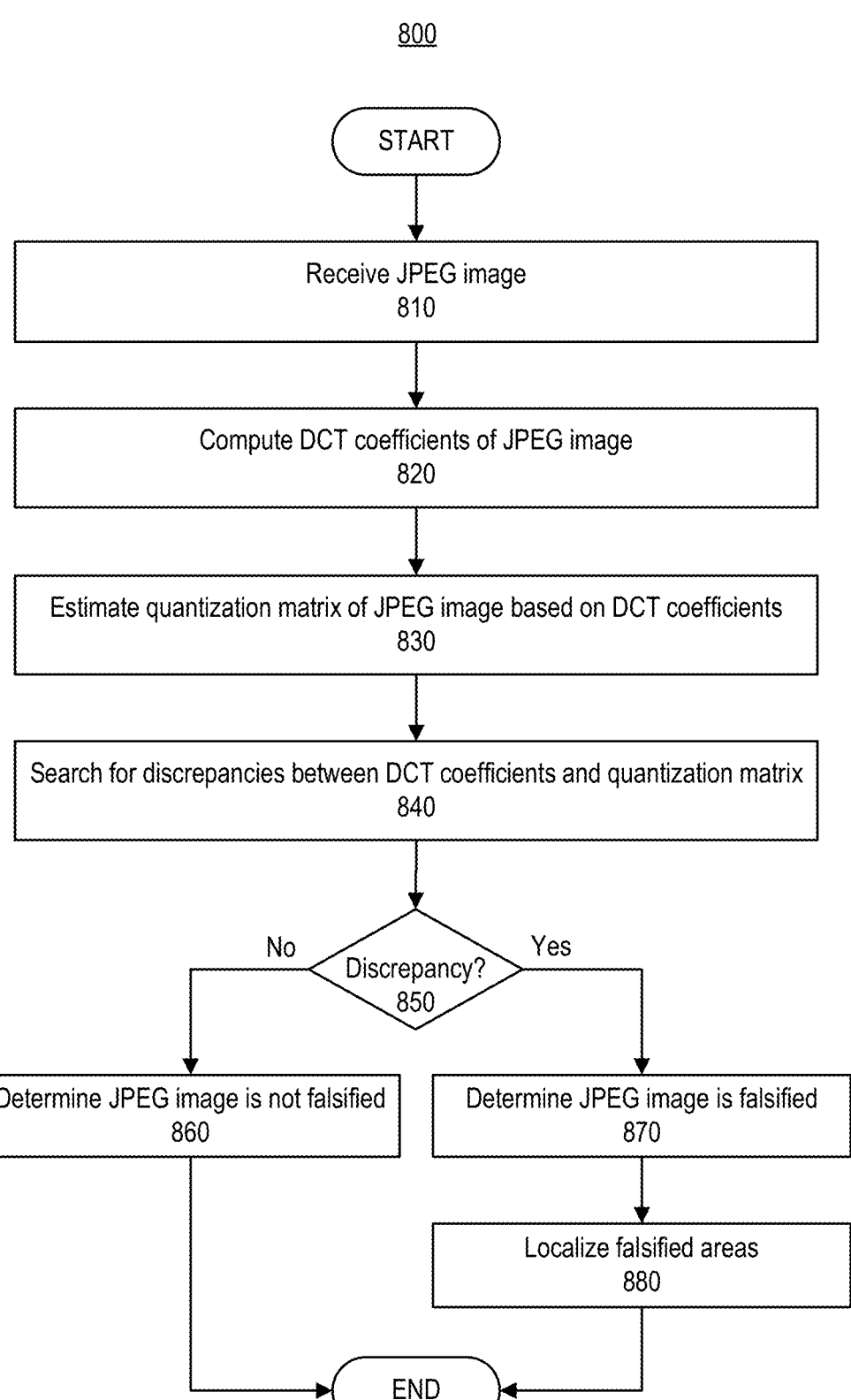
FIG. 8 illustrates an example process for detecting and localizing a falsified area in a JPEG image, according to an embodiment.

FIG. 8 illustrates an example process 800 for detecting and localizing a falsified area in a JPEG image, according to an embodiment. Process 800 may be implemented by a system that is responsible for verifying documents, such as identity documents, in images, which may be acquired by mobile devices (e.g., smartphones, tablet computers, etc.) or uploaded.

Initially, in subprocess 810, a JPEG image is received. The JPEG image may be an RGB image that has been subjected to JPEG compression (e.g., lossless JPEG compression). The JPEG image may be an image of an identity document (e.g., passport, drivers license, etc.). There is a possibility that falsifications have been introduced to the JPEG image. For example, a bad actor may use software to replace a portion of the JPEG image (e.g., a text field, image field, etc.) with a copy and pasted portion to thereby create a falsified area in the JPEG image.

In subprocess 820, the DCT coefficients of the JPEG image are computed. The DCT coefficients may be computed as described above.

In subprocess 830, the quantization matrix of the JPEG image is estimated based on the DCT coefficients, computed in subprocess 820. The quantization matrix may be estimated as described above.

In subprocess 840, a search is performed for discrepancies between the DCT coefficients, computed in subprocess 820, and the quantization matrix, estimated in subprocess 830. The search may be performed as described above.

In subprocess 850, it is determined whether or not the JPEG image contains any falsified areas based on the result of the search performed in subprocess 840. If the JPEG image is not determined to contain any falsified areas (i.e., "No" in subprocess 850), process 800 proceeds to subprocess 860. Otherwise, if the JPEG image is determined to contain a falsified area (i.e., "Yes" in subprocess 850), process 800 proceeds to subprocess 870.

In subprocess 860, the JPEG image may be determined to not be falsified. In this case, the output of process 800 may be an indication that the JPEG image is an authentic image of an identity document. It should be understood that process 800 could be one of multiple tests that are used to determine the authenticity of the JPEG image. Alternatively, process 800 could be the only test that is used to determine the authenticity of the JPEG image.

In subprocess 870, the JPEG image may be determined to be falsified. In this case, the output of process 800 may be an indication that the JPEG image is an authentic image of an identity document.

In addition, in subprocess 880, the falsified area(s) of the JPEG image may be localized as described above. In this case, the output of process 800 may comprise an identification of the location of each area that has been falsified and/or an identification of each field in the identity document that has been falsified.

Example Processing System

Figure 9:
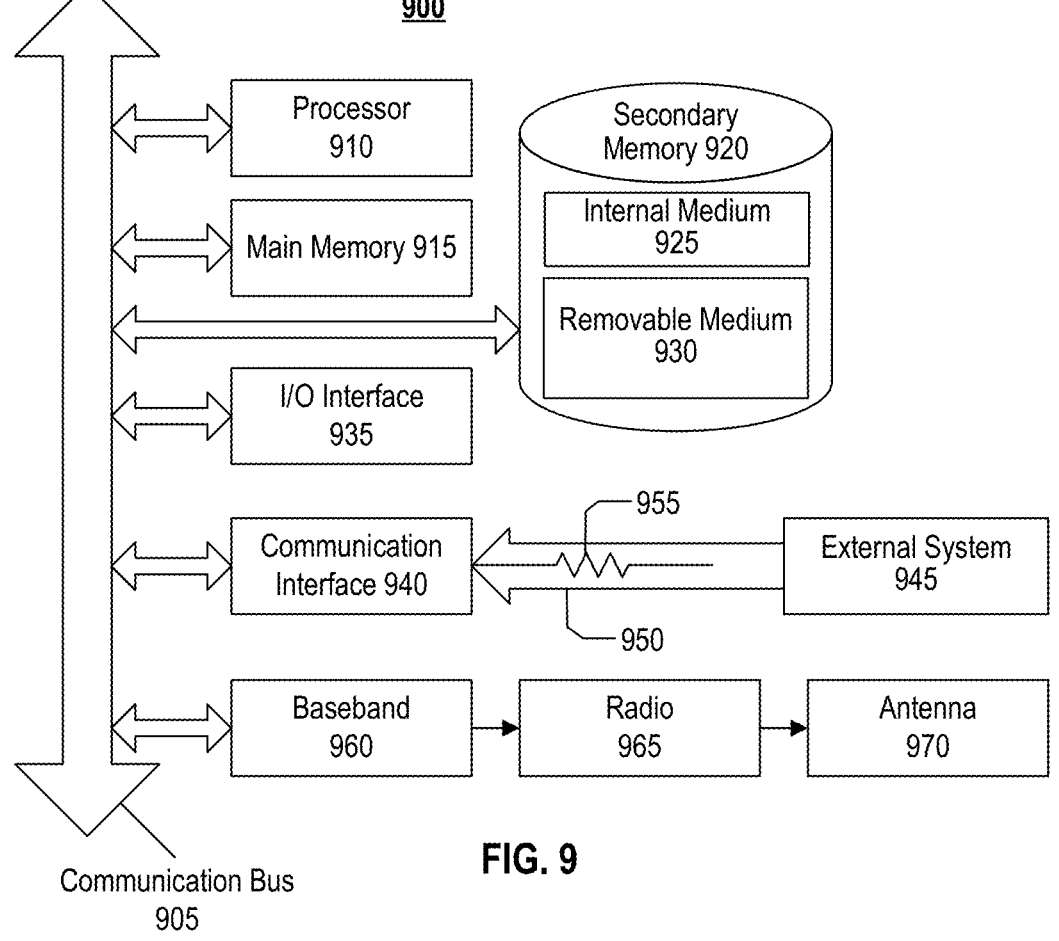
FIG. 9 illustrating an example processing system that may be used to execute the described process, according to an embodiment.

FIG. 9 is a block diagram illustrating an example wired or wireless system 900 that may be used in connection with various embodiments described herein. For example, system 900 may be used as or in conjunction with one or more of the processes, methods, or functions (e.g., to store and/or execute one or more software modules) described herein, including to store and/or execute software implementing process 800. System 900 can be any processor-enabled device (e.g., server, personal computer, etc.) that is capable of wired or wireless data communication. Other processing systems and/or architectures may also be used, as will be clear to those skilled in the art.

System 900 may comprise one or more processors 910. Processor(s) 910 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 910. Examples of processors which may be used with system 900 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 910 may be connected to a communication bus 905. Communication bus 905 may include a data channel for facilitating information transfer between storage and other peripheral components of system 900. Furthermore, communication bus 905 may provide a set of signals used for communication with processor 910, including a data bus, address bus, and/or control bus (not shown). Communication bus 905 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 900 may comprise main memory 915. Main memory 915 provides storage of instructions and data for programs executing on processor 910, such as one or more of the functions and/or modules discussed herein. It should be understood that programs stored in the memory and executed by processor 910 may be written and/or compiled according to any suitable language, including without limitation C/C++, Java, JavaScript, Perl, Python, Visual Basic, .NET, and the like. Main memory 915 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 900 may comprise secondary memory 920. Secondary memory 920 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 900. The computer software stored on secondary memory 920 is read into main memory 915 for execution by processor 910. Secondary memory 920 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 920 may include an internal medium 925 and/or a removable medium 930. Removable medium 930 is read from and/or written to in any well-known manner. Removable storage medium 930 may be, for example, a magnetic tape drive, a compact disc (CD) drive, a digital versatile disc (DVD) drive, other optical drive, a flash memory drive, and/or the like.

System 200 may comprise an input/output (I/O) interface 935. I/O interface 935 provides an interface between one or more components of system 900 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 900 may comprise a communication interface 940. Communication interface 940 allows software to be transferred between system 900 and external devices (e.g. printers), networks, or other information sources. For example, computer-executable code and/or data may be transferred to system 900, over one or more networks (e.g., including the Internet), from a network server via communication interface 940. Examples of communication interface 940 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 900 with a network or another computing device. Communication interface 940 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 940 is generally in the form of electrical communication signals 955. These signals 955 may be provided to communication interface 940 via a communication channel 950 between communication interface 940 and an external system 945. In an embodiment, communication channel 950 may be a wired or wireless network, or any variety of other communication links. Communication channel 950 carries signals 955 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 915 and/or secondary memory 920. Computer-executable code can also be received from an external system 945 via communication interface 940 and stored in main memory 915 and/or secondary memory 920. Such computer-executable code, when executed, enable system 900 to perform the various functions of the disclosed embodiments as described elsewhere herein.

In an embodiment that is implemented using software, the software may be stored on a computer-readable medium and initially loaded into system 900 by way of removable medium 930, I/O interface 935, or communication interface 940. In such an embodiment, the software is loaded into system 900 in the form of electrical communication signals 955. The software, when executed by processor 910, preferably causes processor 910 to perform one or more of the processes and functions described elsewhere herein.

System 900 may comprise wireless communication components that facilitate wireless communication over a voice network and/or a data network (e.g., in the case of a mobile device, such as a smart phone). The wireless communication components comprise an antenna system 970, a radio system 965, and a baseband system 960. In system 900, radio frequency (RF) signals are transmitted and received over the air by antenna system 970 under the management of radio system 965.

In an embodiment, antenna system 970 may comprise one or more antennae and one or more multiplexors (not shown) that perform a switching function to provide antenna system 970 with transmit and receive signal paths. In the receive path, received RF signals can be coupled from a multiplexor to a low noise amplifier (not shown) that amplifies the received RF signal and sends the amplified signal to radio system 965.

In an alternative embodiment, radio system 965 may comprise one or more radios that are configured to communicate over various frequencies. In an embodiment, radio system 965 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 965 to baseband system 960.

If the received signal contains audio information, then baseband system 960 decodes the signal and converts it to an analog signal. Then the signal is amplified and sent to a speaker. Baseband system 960 also receives analog audio signals from a microphone. These analog audio signals are converted to digital signals and encoded by baseband system 960. Baseband system 960 also encodes the digital signals for transmission and generates a baseband transmit audio signal that is routed to the modulator portion of radio system 965. The modulator mixes the baseband transmit audio signal with an RF carrier signal, generating an RF transmit signal that is routed to antenna system 970 and may pass through a power amplifier (not shown). The power amplifier amplifies the RF transmit signal and routes it to antenna system 970, where the signal is switched to the antenna port for transmission.

Baseband system 960 is communicatively coupled with processor(s) 910, which have access to memory 915 and 920. Thus, software can be received from baseband processor 960 and stored in main memory 910 or in secondary memory 920, or executed upon receipt. Such software, when executed, can enable system 900 to perform the various functions of the disclosed embodiments.

What is claimed is:

1. A method comprising
capturing Joint Photographic Experts Group (JPEG) image;
using at least one hardware processor to:
receive the captured Joint Photographic Experts Group (JPEG) image;
compute discrete cosine transform (DCT) coefficients of the JPEG image;
save information about the position of the 8×8 pixel blocks corresponding to the coefficients;

wherein computing DCT coefficients of the JPEG image comprises:
complementing sides of the JPEG image up to a multiplicity with eight black pixels;
transforming the JPEG image from a red-green-blue (RGB) color space to a luma-blue-difference-chroma-red-difference-chroma (YCbCr) color space;
splitting a brightness channel in the YCbCr color space into a plurality of blocks of 8×8 pixels;
applying a discrete cosine transform to each of the plurality of blocks; and
discarding any of the plurality of blocks that contains pixels with saturated values;
estimate a quantization matrix of the JPEG image based on the computed DCT coefficients;
wherein estimating the quantization matrix of the JPEG image based on the computed DCT coefficients comprises, for each of 64 frequencies in each of the plurality of blocks:
calculating a factorial histogram h, wherein h(x) is a number of DCT coefficients that do not have a remainder when divided by x, for each integer x in range from 1 to 1000;
normalizing the factorial histogram h by a total number of DCT coefficients; and
estimating a quantization step of the quantization matrix for the frequency using the normalized factorial histogram h;
wherein estimating the quantization step of the quantization matrix using the normalized factorial histogram h comprises:
calculating $\widehat{q_1} = \max\{x|h(x) \geq T_1\}$, wherein $T_1$ is a predefined threshold;
when $\widehat{q_1} > 2$, estimating the quantization step for the frequency as $\widehat{q_1}$; and
when $\widehat{q_1} \leq 2$,
calculating $y = \max\{x|h(x) \geq T_2\}$, wherein $T_2$ is a predefined threshold,
when $y < 4$, estimating the quantization step for the frequency as $\widehat{q_1}$, and
when $y \geq 4$,
constructing a modified factorial histogram $\underline{h}$, wherein $\underline{h}(x)$ is the number of DCT coefficients that do not have a remainder when divided by x and do not belong to a set $M = \{ky \pm 1, k \in 2\}$, wherein k is an integer value within a range Z,
normalizing the modified factorial histogram $\underline{h}$ by the total number of DCT coefficients that do not belong to the set M,
calculating $\widehat{q_2} = \max\{x|h(x) \geq T_3\}$, wherein $T_3$ is a predefined threshold,
when $\widehat{q_2} > 3$, estimating the quantization step for the frequency as $\widehat{q_2}$, and
when $\widehat{q_2} \leq 3$, estimating the quantization step for the frequency as $\widehat{q_1}$,
search for discrepancies between the computed DCT coefficients and the estimated quantization matrix; and
determine whether the JPEG image contains any falsified areas based on a result of the search;
localizing the falsified areas;
outputting the result of localizing the falsified areas.

2. The method of claim 1, further comprising using the at least one hardware processor to, when determining that the JPEG image contains one or more falsified areas, identify a location of each of the one or more falsified areas.

3. The method of claim 1, wherein estimating the quantization step of the quantization matrix further comprises estimating a quantization step over an entirety of the JPEG image based on the quantization step estimated for each of the 64 frequencies of each of the plurality of blocks.

4. The method of claim 1, wherein searching for discrepancies between the computed DCT coefficients and the estimated quantization matrix comprises:

generating a first image $I_1$ in which each of the plurality of blocks is assigned a pixel, wherein each pixel for each of the plurality of blocks has a value representing a number of frequencies at which a DCT coefficient corresponding to the block does belong to a range $\{[k\hat{q}-1, k\hat{q}+1], k \in Z\}$, wherein k is an integer value within a range Z, and $\hat{q}$ is the estimated quantization step for a respective frequency;

determining a set $M_2$ of frequencies, for which at least one of the plurality of blocks at one of the frequencies in set $M_2$ has a computed DCT coefficient not belonging to the range $\{[k\hat{q}-1, k\hat{q}+1], k \in Z\}$;

generating a second image $I_2$ in which each of the plurality of blocks is assigned a pixel, wherein a size of the second image $I_2$ is a same size as the first image $I_1$, and wherein each pixel for each of the plurality of blocks in the second image $I_2$ has a value representing a number of frequencies at which the DCT coefficient corresponding to the block has an absolute value greater than one; and generating a third image $I_3$, with a same size as the first image $I_1$ and the second image $I_2$, according to:

$$I_3(u) = \max \left\{ \frac{I_1(u) - t}{I_2(u) + 1}, 0 \right\}$$

wherein u is a pixel position, and t is a predefined value.

5. The method of claim 4, further comprising using the at least one hardware processor to, when determining that the JPEG image contains one or more falsified areas, identify a location of each of the one or more falsified areas by:

generating a fourth image $I_4$ by applying a morphological operation to the third image $I_3$; and generating a fifth image $I_s$ with a same size as the JPEG image, wherein each pixel within each of the plurality of blocks in the fifth image $I_s$ has a value equal to a value of a pixel in the fourth image $I_4$ that corresponds to that block.

6. The method of claim 5, further comprising using the at least one hardware processor to calculate a probability of manipulation based on the fourth image 14.

7. The method of claim 1, further comprising using the at least one hardware processor to search for a position of a JPEG compression grid for the JPEG image.

8. A system comprising:

means for capturing Joint Photographic Experts Group (JPEG) image;

using at least one hardware processor; and software configured to, when executed by the at least one hardware processor, receive the captured Joint Photographic Experts Group (JPEG) image;

compute discrete cosine transform (DCT) coefficients of the JPEG image;

save information about the position of the 8×8 pixel blocks corresponding to the coefficients;

wherein computing DCT coefficients of the JPEG image comprises:

complementing sides of the JPEG image up to a multiplicity with eight black pixels;

transforming the JPEG image from a red-green-blue (RGB) color space to a luma-blue-difference-chroma-red-difference-chroma (YCbCr) color space;

splitting a brightness channel in the YCbCr color space into a plurality of blocks of 8×8 pixels;

applying a discrete cosine transform to each of the plurality of blocks; and discarding any of the plurality of blocks that contains pixels with saturated values;

estimate a quantization matrix of the JPEG image based on the computed DCT coefficients;

wherein estimating the quantization matrix of the JPEG image based on the computed DCT coefficients comprises, for each of 64 frequencies in each of the plurality of blocks:

calculating a factorial histogram h, wherein h(x) is a number of DCT coefficients that do not have a remainder when divided by x, for each integer x in range from 1 to 1000;

normalizing the factorial histogram h by a total number of DCT coefficients; and estimating a quantization step of the quantization matrix for the frequency using the normalized factorial histogram h;

wherein estimating the quantization step of the quantization matrix using the normalized factorial histogram h comprises:

calculating $\widehat{q_1} = \max\{x | h(x) \geq T_1\}$, wherein $T_1$ is a predefined threshold;

when $\widehat{q_1} > 2$, estimating the quantization step for the frequency as $\widehat{q_1}$; and when $\widehat{q_1} \leq 2$, calculating $y = \max\{x | h(x) \geq T_2\}$, wherein $T_2$ is a predefined threshold, when $y < 4$, estimating the quantization step for the frequency as $\widehat{q_1}$, and when $y \geq 4$, constructing a modified factorial histogram $\underline{h}$, wherein $\underline{h}(x)$ is the number of DCT coefficients that do not have a remainder when divided by x and do not belong to a set $M = \{ky \pm 1, k \in Z\}$, wherein k is an integer value within a range Z, normalizing the modified factorial histogram $\underline{h}$ by the total number of DCT coefficients that do not belong to the set M, calculating $\widehat{q_2} = \max\{x | \underline{h}(x) \geq T_3\}$, wherein $T_3$ is a predefined threshold, when $\widehat{q_2} > 3$, estimating the quantization step for the frequency as $\widehat{q_2}$, and when $\widehat{q_2} \leq 3$, estimating the quantization step for the frequency as $\widehat{q_1}$, search for discrepancies between the computed DCT coefficients and the estimated quantization matrix; and determine whether the JPEG image contains any falsified areas based on a result of the search;

localizing the falsified areas;

outputting the result of localizing the falsified areas.

9. A non-transitory computer-readable medium having instructions stores thereon, wherein the instructions, when executed by a processor, cause the processor to:

receive a captured Joint Photographic Experts Group (JPEG) image;

compute discrete cosine transform (DCT) coefficients of the JPEG image;

save information about the position of the 8×8 pixel blocks corresponding to the coefficients;

wherein computing DCT coefficients of the JPEG image comprises:

complementing sides of the JPEG image up to a multiplicity with eight black pixels;

transforming the JPEG image from a red-green-blue (RGB) color space to a luma-blue-difference-chroma-red-difference-chroma (YCbCr) color space;

splitting a brightness channel in the YCbCr color space into a plurality of blocks of 8×8 pixels;

applying a discrete cosine transform to each of the plurality of blocks; and discarding any of the plurality of blocks that contains pixels with saturated values;

estimate a quantization matrix of the JPEG image based on the computed DCT coefficients;

wherein estimating the quantization matrix of the JPEG image based on the computed DCT coefficients comprises, for each of 64 frequencies in each of the plurality of blocks:

calculating a factorial histogram h, wherein h (x) is a number of DCT coefficients that do not have a remainder when divided by x, for each integer x in range from 1 to 1000;

normalizing the factorial histogram h by a total number of DCT coefficients; and estimating a quantization step of the quantization matrix for the frequency using the normalized factorial histogram h;

wherein estimating the quantization step of the quantization matrix using the normalized factorial histogram h comprises:

calculating $\widehat{q_1} = \max\{x | h(x) \geq T_1\}$, wherein $T_1$ is a predefined threshold;

when $\widehat{q_1} > 2$, estimating the quantization step for the frequency as $\widehat{q_1}$; and when $\widehat{q_1} \leq 2$, calculating $y = \max\{x | h(x) \geq T_2\}$, wherein $T_2$ is a predefined threshold, when $y < 4$, estimating the quantization step for the frequency as $\widehat{q_1}$, and when $y \geq 4$, constructing a modified factorial histogram $\underline{h}$, wherein $\underline{h}(x)$ is the number of DCT coefficients that do not have a remainder when divided by x and do not belong to a set $M = \{ky \pm 1, k \in Z\}$, wherein k is an integer value within a range Z, normalizing the modified factorial histogram $\underline{h}$ by the total number of DCT coefficients that do not belong to the set M, calculating $\widehat{q_2} = \max\{x | h(x) \geq T_3\}$, wherein $T_3$ is a predefined threshold, when $\widehat{q_2} > 3$, estimating the quantization step for the frequency as $\widehat{q_2}$, and when $\widehat{q_2} \leq 3$, estimating the quantization step for the frequency as $\widehat{q_1}$, search for discrepancies between the computed DCT coefficients and the estimated quantization matrix; and determine whether the JPEG image contains any falsified areas based on a result of the search;

localizing the falsified areas;

outputting the result of localizing the falsified areas.

*     *     *     *     *